United States Patent [19]
Rhee et al.

[11] Patent Number: 5,597,292
[45] Date of Patent: Jan. 28, 1997

[54] PIEZOELECTRIC BOOSTER PUMP FOR A BRAKING SYSTEM

[75] Inventors: Seong K. Rhee, Northville; Alistair G. Taig, Edwardsburg, both of Mich.; Kenneth S. Towers, Granger, Ind.

[73] Assignee: AlliedSignal, Inc., Morristown, N.J.

[21] Appl. No.: 490,360

[22] Filed: Jun. 14, 1995

[51] Int. Cl.$^6$ ....................................... F04B 17/00
[52] U.S. Cl. ................. 417/322; 417/413.2; 303/116.4
[58] Field of Search ............................. 417/322, 413.1, 417/413.2, 560; 303/116.4

[56] References Cited

U.S. PATENT DOCUMENTS

| | | |
|---|---|---|
| 4,231,287 | 11/1980 | Smiley . |
| 4,738,493 | 4/1988 | Inagaki et al. ........................ 417/505 |
| 5,378,120 | 1/1995 | Taig .................................... 417/413.2 |

FOREIGN PATENT DOCUMENTS

| | | |
|---|---|---|
| A2354249 | 11/1974 | Germany . |
| A3545800 | 7/1986 | Germany . |
| 58-140491 | 8/1983 | Japan . |

OTHER PUBLICATIONS

Document Number Abs vol. 7 No. 257 (M–256) 1402 Date Nov. 1983 Country Japan.

*Primary Examiner*—Timothy Thorpe
*Assistant Examiner*—Roland G. McAndrews, Jr.
*Attorney, Agent, or Firm*—Leo H. McCormick, Jr.

[57] ABSTRACT

An ultrasonic pump having a first housing connected to a second housing to create a cavity therebetween. The first housing has a central stem that extends into the cavity with a passage for connecting the cavity with an outlet port. The second housing has an inlet port for communicating hydraulic fluid to the cavity. A plurality of piezoelectric disc are located on the stem by a first diaphragm to defined a actuation chamber within the cavity. The first diaphragm engages the first housing and stem to isolate the piezoelectric disc from hydraulic fluid supplied to the cavity and place a predetermined axial force on the piezoelectric disc. A second diaphragm located in the first and second housing has first and second surfaces which are substantially equal distances from the passage and the inlet port. Thereafter, air is bleed from the cavity to assure that only hydraulic fluid is present in the cavity. The piezoelectric disc are connected to a source of electrical energy and in response to an excitation signal develop a fluctuating force. The fluctuating force has an axial component and a radial component and the axial component alone is communicated to the first diaphragm. After the axial component of the fluctuating force overcomes the predetermined axial force, the fluid pressure of the hydraulic fluid in the cavity changes as a function of the axial component force. This change in fluid pressure causes sequential movement of first and second surfaces of the second diaphragm toward the inlet port and passage and as a result hydraulic fluid is transmitted from the cavity through the passage to the outlet port.

16 Claims, 2 Drawing Sheets

PIEZOELECTRIC BOOSTER PUMP FOR A BRAKING SYSTEM

The present invention relates generally to an ultrasonic hydraulic booster pump having a plurality of piezoelectric disc located in a actuation chamber and isolated from a pumping chamber by a first diaphragm such that pressure changes in a cavity moves a second diaphragm to supply hydraulic fluid to a vehicle braking system.

Some vehicle braking systems use a hydraulic booster to increase hydraulic pressure that is transmitted to operate the brakes of a vehicle. Typically, a source of fluid pressure, such as a pump and an associated accumulator, are provided in the vehicle braking system to boost the fluid pressure of a hydraulic booster such as a master cylinder with a boost chamber. Such hydraulically boosted systems typically require a large number of parts including a pump, an accumulator to provide immediate high pressure when the pump is activated, all of which can lead to a somewhat complex and expensive system. It is highly desirable to provide a simplified hydraulically boosted braking system which requires as few components and parts as necessary, with the components and parts easily and inexpensively manufactured and being highly reliable. It is also highly desirable that the components and/or parts of a hydraulically boosted system be as small as possible, the reduction in size not only saving packaging space under the hood of the vehicle but contributing toward weight reduction for the vehicle. It is also highly desirable that the hydraulically boosted system be compatible with an anti-lock braking system such that the boost pressure producing mechanism effects the function of a modulator and pump typically present in an anti-lock brake system.

U.S. Pat. No. 5,378,120 discloses solutions to the above brake system by providing an ultrasonic pump to provide an increase in hydraulic fluid pressure for a brake system. The ultrasonic pump includes a housing with a plurality of piezoelectric rings disposed in a ring housing located in a cavity. A source of electrical current is supplied to excite the piezoelectric rings which cause a diaphragm to resonate and as a result fluid is communicated from the cavity to an outlet port. This ultrasonic pump functions in an adequate manner however the fluctuating effect developed by the piezoelectric disc is modified by a corresponding radial dimensional change with an axial dimensional change such that the resulting hydraulic boost pressure is reduced. In addition, it is envisioned that during certain operational conditions, a vacuum may develop to further reduce the effective fluctuating of the fluid in the cavity and the hydraulic boost pressure.

The present invention provides solutions to the above indicated problems through an ultrasonic pump wherein the piezoelectric disc are isolated in a actuation chamber connected to the surrounding atmosphere and only the resulting axial component created by excitation of the piezoelectric discs are used to fluctuate the pressure of the hydraulic fluid in the cavity. The ultrasonic pump has a first housing connected to a second housing to create a cavity therebetween. The first housing has a central stem that extends into the cavity with a passage for connecting the cavity with an outlet port. The second housing has an inlet port for communicating hydraulic fluid to the cavity. A plurality of piezoelectric disc are located on the stem by a first diaphragm to defined a actuation chamber within the cavity. The first diaphragm engages the first housing and stem to isolating the piezoelectric disc from hydraulic fluid supplied to the cavity and place a predetermined axial force on the piezoelectric disc. A second diaphragm located between the first and second housing has first and second surfaces which are substantially equal distances from the passage and the inlet port. The piezoelectric discs are connected to a source of electrical energy and in response to input force an excitation signal develops a fluctuating force. The fluctuating force has an axial component and a radial component with only the axial component being communicated to the first diaphragm. After the axial component of the fluctuating force overcoming the predetermined axial force the fluid pressure of the hydraulic fluid in the cavity changes as a function of the axial component force. This change in fluid pressure causes sequentially movement of first and second surfaces of the second diaphragm toward the inlet port and passage and as a result hydraulic fluid is transmitted from the cavity through the passage to the outlet port.

One way of carrying out the invention is described in detail below with reference to the drawings which illustrate an embodiment in which.

Figure 1:
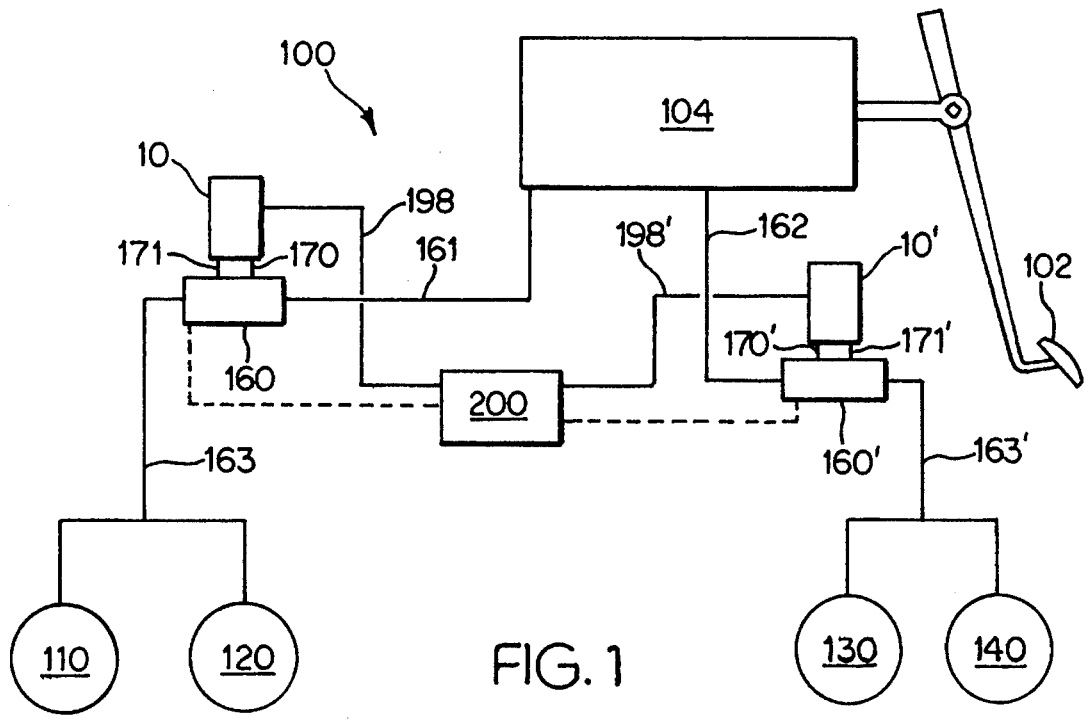
FIG. 1 is a schematic illustration of a vehicle braking system utilizing the ultrasonic pump and booster valve of the present invention.

FIG. 1 illustrates a pressure boosted hydraulic braking system 100 which includes a first ultrasonic pump 10 and boost valve 160 and second ultrasonic pump 10' and boost valve 160' for boosting the hydraulic fluid pressure supplied to the wheel brakes 110, 120, 130, 140. Braking system 100 includes a typical brake pedal 102 connected with master cylinder 104 that, when activated, communicates hydraulic braking pressure to the wheels of the vehicle. Braking system 100 is a cross split or "X" system wherein a first chamber in the master cylinder 104 communicates hydraulic braking pressure to the left front wheel brake 110 and right rear wheel brake 120 while a second chamber of the master cylinder 104 communicates hydraulic braking pressure to the right front wheel brake 130 and left rear wheel brake 140. The master cylinder 104 is connected with wheel brakes 110 and 120 through boost valve 160 associated with ultrasonic booster pump 10 and with wheel brakes 130 and 140 through boost valve 160' associated with ultrasonic pump 10'. An electronic controller or "ECU" 200 is connected with each of the ultrasonic booster pumps 10, 10'.

Figure 2:
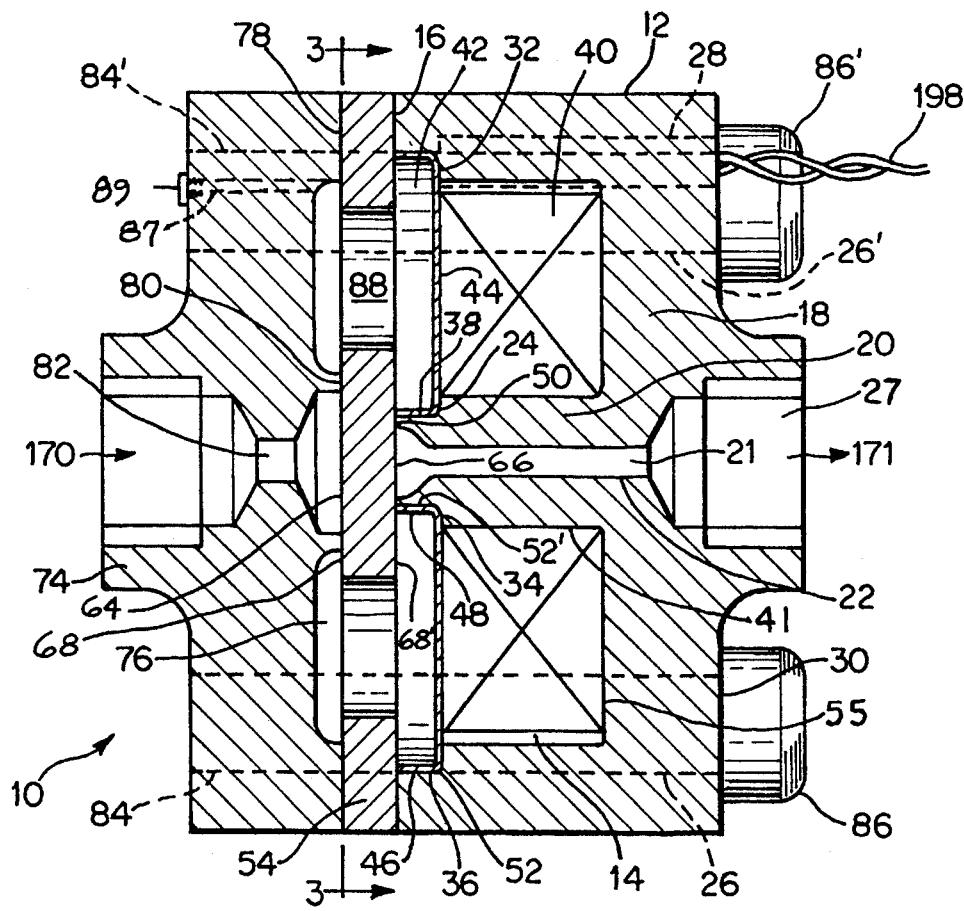
FIG. 2 is a section view of the ultrasonic hydraulic booster pump of the present invention.
Figure 3:
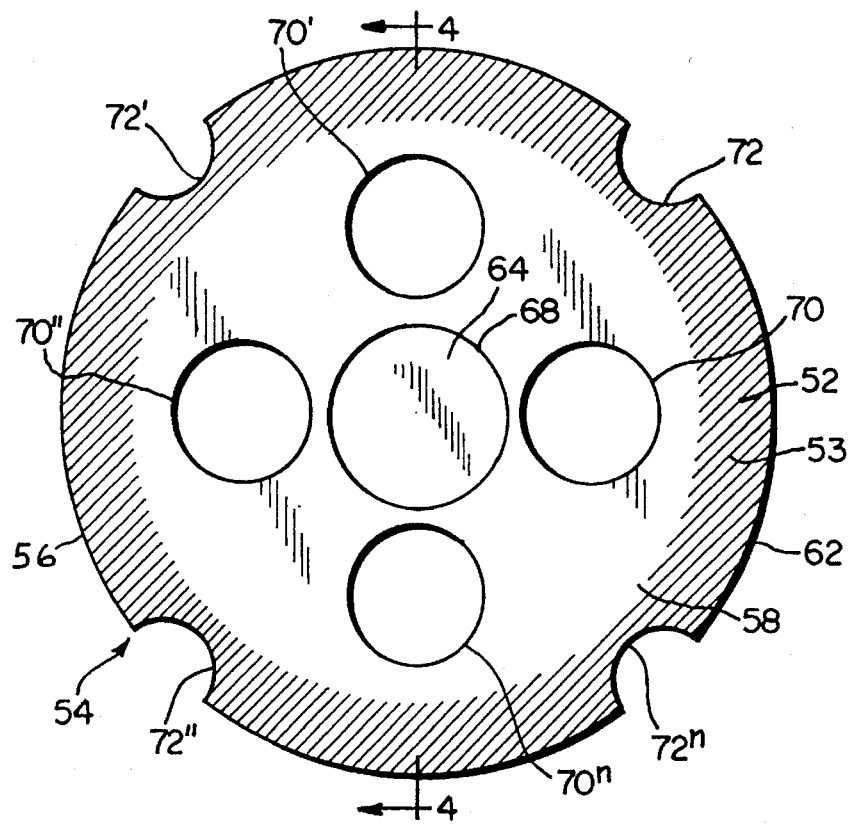
FIG. 3 is a section view taken along view line 3—3 of FIG. 2.
Figure 4:
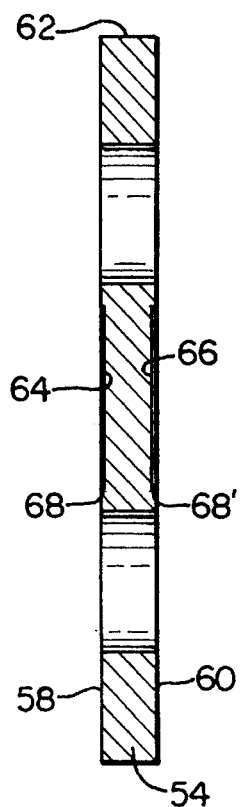
FIG. 4 is a section view taken along view line 4—4 of FIG. 3.

The of the ultrasonic pumps 10,10' and associated with boost valves 160, 160' each comprise the same structure and functional operation with pump 10 illustrated in FIGS. 2, 3 and 4. The boost valves 160, 160' are fully disclosed in U.S. Pat. No. 5,378,120 and only described hereinafter in a general manner. Boost valves 160, 160' are provided so that braking pressure can be held at any pressure level without providing continual electrical power to pumps 10, 10'. The operational pistons in boost valves 160, 160' each includes an enlarged diameter section which is exposed to master cylinder fluid pressure and a smaller area intermediate diameter section which is exposed to the intensified or boosted fluid pressure that is supplied to effect the brake application. The area ratio of those diameter sections defines the ratio of brake fluid pressure to master cylinder fluid pressure (boost pressure). The pistons are resiliently positioned in the central at-rest position. Boost valves 160, 160' are connected to receive pressurized hydraulic fluid from master cylinder 104 during a brake application. Such pressurized hydraulic fluid is simultaneously communicated to move a piston in the boost valve 160, 160' and through conduits 170, 170' to inlet ports 20, 20' of the ultrasonic pumps 10, 10'. Movement of the piston in the boost valves 160, 160' activates a switch therein to provide ECU 200 with a signal indicating development of pressurized hydraulic in master cylinder 104 as a result of an input force applied to pedal 102. ECU 200 thereafter controls the actuation of pumps 10, 10' to increase the level of the pressure in the hydraulic fluid and return the same through conduits 171, 171' to supply pressurized hydraulic fluid to wheel brakes 110, 120, 130, 140 to effect a brake application.

When the brake pressure developed by ultrasonic pumps 10, 10' reaches the desired value, the forces on pistons in boost valves 160, 160' will balance and the pistons return to their central or at-rest position to deactivate the switch and terminate the signal to the ECU 200 and correspondingly interrupt the electrical current supplied to the ultrasonic pumps 10, 10'. This hydraulic braking pressure will be maintained at the respective brake(s) until the driver effects a pressure change by changing the input force as applied to pedal 102 in the operation of master cylinder 104. To decrease the pressure at the brake(s), decreased hydraulic fluid pressure received from the master cylinder 104 and presented to boost valve 106, 106' permit the operational pistons spool to move toward the inlet port as a result of the higher brake pressure present at an outlet port and open a communication path by way of line 171 so that braking fluid pressure may return to master cylinder 104 by way of conduits 161, 162. Again, when a balance is reached, the operational pistons return to their at-rest position and pressure at the brake(s) will be maintained at that position.

The fluid pressure supplied to the wheel brakes 110, 120, 130, and 140 in braking system 100 is initially from master cylinder 104 but when each pump 10, 10' is operational most of the pressure is supplied to the brakes from the pumps while the master cylinder pressure remains relatively low. If a pump failure occurs, the respective operational pistons in the boost valves 160, 160' move to pressurize fluid as a function of the input applied by an operator through pedal 102 to master cylinder 104. In this situation the operator must supply the braking pressure directly, which requires more pedal effort, but without any increase in travel compared with a boosted system In a split brake system the increased pedal force would increase the pressure on the remaining boosted brakes and to a lesser extent on the failed boosted brakes, until the demanded deceleration is achieved. There would be no additional pedal movement under this partial failure condition, and only a small increase in driver effort.

The ultrasonic pumps 10, 10' utilized in conjunction with the brake system 100 illustrated in FIG. 1 are identical and as a result the structure hereinafter described in detail in FIGS. 2, 3 and 4 for pump 10 also apply for pump 10'.

Pump 10 includes a first housing 12 which is joined to a second housing 74 by a plurality of bolts 86, 86' . . . 86$^n$.

The first housing 12 has an annular cavity 14 therein that extends from an annular peripheral face 16 toward a closed end 18. A central stem 20 which extends from end 18 into cavity 14 has an axial passage 22 for connecting an internal annular face 24 with an outlet port 26 connected to conduit 171. Face 16 and face 24 are located in a same plane defined by the external surface of housing 12. Housing 12 has a plurality of openings 26, 26' that extend from external surface 30 to face 16 and a passage 28 that connects cavity 14 with the surrounding environment. Housing 12 has a first shoulder 32 formed on an external surface of cavity 14 and a second shoulder 34 formed on stem 20 such that the first 32 and second 34 shoulders are in the same plane which is parallel to the plane of face 16. A nylon coating 52 is formed on at least annular surface 36 of housing 12 and annular surface 38 of stem 20. Nylon coating is comprised of Nylon 6 although other coatings may also be used.

A plurality of piezoelectric discs 40 are located in cavity 14 each of which have central opening 42 that surrounds stem 20. Piezoelectric discs 40 are connected by lead 198 to receive electrical operational signals from ECU 200.

A first diaphragm 42 made of a metallic material such as stainless has a disc base 44 with an external annular lip 46 on its peripheral surface and an internal annular lip 48 which surrounds a central opening 50. A nylon coating 52 may be applied on the external surface of annular lip 46 and the internal surface of annular surface 48. Diaphragm 42 is press fit into cavity 14 such that annular lip 46 engages housing surface 36 and annular lip 48 engages stem 20 to define a actuation chamber 54 for the plurality of piezoelectric discs 40. An interference fit which is designed into the discs and housing 12 such that actuation chamber 54 is now isolated within cavity 14. The nylon coatings 52, 52' applied on the surfaces thereof assist the interference fit in sealing the remainder of cavity 14 from the surrounding environment. This interference fit also develops a predetermined axial force which acts on the plurality of piezoelectric disc 40 such that this first housing could be separately manufactured and joined with the other components which comprise pump 10.

A second diaphragm 54 made of a metallic material such as maraging steel comprised of a disc 56 as best shown in FIGS. 3 and 4 has parallel first 58 and second 60 surfaces extending from a peripheral edge 62 having a substantially first thickness and parallel first 64 and second 66 central surfaces having a substantially second thickness. The first thickness on disc 56 extends from the peripheral edge 62 to annular shoulder 68, 68' such that the discs are symmetrical such that during assembly with the first housing 12 either central surface 64 or 66 would function in the same manner as hereinafter described. Disc 56 has a plurality of opening 70, 70' . . . 70$^n$ to provide a passage between surfaces 58 and 60. A nylon coating 52 as best illustrated in FIG. 3 is formed on an annular peripheral surfaces 53 of surfaces 58 and 60 of disc 54. Disc 54 has a series of semi-circular indentations 72, 72' . . . 72$^n$ located on peripheral edge 62 which are aligned with openings 26, 26' . . . 26$^n$ to position the second central surface with face 50 on stem 20.

A second housing 74 has an annular cavity 76 adjacent a face 78 and an annular seat on face 80 which surrounds an inlet port 82 connected to conduit 170 for receiving pressurized hydraulic fluid from conduit 161 connected to master cylinder 104. A series of threaded openings 84, 84' . . . 84$^n$ are designed to receive bolts 86, 86' . . . 86$^n$ by which the second housing 74 is joined to the first housing 12. The face 78 and annular seat 80 are located in a same plane perpendicular to threaded openings 84, 84' . . . 84$^n$.

When bolts 86, 86' . . . 86$^n$ are placed in openings 26, 26' . . . 26$^n$ and the semi-circular guides 72, 72' . . . 72$^n$ on the peripheral edge 62 of disc 56 are aligned on bolts 86, 86' . . . 86$^n$, torque is applied to bolts 86, 86' . . . 86$^n$ to engages threaded openings 84, 84' . . . 84$^n$ and join the first housing 12 with the second housing 74 such that disc 56 is sandwiched therebetween. When a predetermined torque has been applied to bolts 86, 86' . . . 86$^n$, an operational chamber 88 is formed by sealing cavities 14 and 76. In addition, since the central surfaces 64 and 66 are parallel to surfaces 58 and 60 and faces 16 and 78 are in parallel planes the distance from central surface 64 to seat on face 80 and from central surface 66 to seat defined on face 24 are identical and in this embodiment about 0.0075 cm. As bolts 86, 86' ... 86" are torqued, the nylon coating 52 on diaphragm 42 is compressed to aid in sealing operational chamber 88 from the surrounding environment while surface 60 on diaphragm 56 engages annular lips 46 and 48 on the first diaphragm 44 to finalize the predetermined axial force to compress the piezoelectric disc 40 in actuation chamber 55.

When electrical current is supplied through lead 198 to activate or excite the piezoelectric disc 40 a fluctuating force is created. The fluctuating force has an axial component and a radial component, only the axial component is of consequence in the development of fluctuating in the first diaphragm 44 and then only after overcoming the predetermined axial force applied to compress the piezoelectric discs 40. However when such predetermined force is overcome the pressure of the hydraulic fluid in chamber 88 changes as the central surfaces 64 and 66 sequentially move toward and away from faces 80 and 24, respectively as a result of such axial component of the fluctuating force. Such sequential movement of the second diaphragm 54 causes hydraulic fluid to be communicated from chamber 88 through passage 21 in stem 20 to outlet port 26 for distribution to the brake system by way of conduit 171. The change in hydraulic fluid pressure in chamber 88 is a function of the ratio of the area of seat 80 to seat 24 such that the increase or theoretical change in hydraulic fluid pressure can be calculated from the fluctuating expected to be developed by the piezoelectric discs 40. Thus, it is important that accurate tolerances are established by the torquing of bolts 86, 86' ... 86" to join the first housing 12 to the second housing 74 such that the movement of the central surfaces 64 and 66 of metallic disc 56 respond to changes in fluid pressure in chamber 88 to restrict flow but never touch or engage faces 80 and 24. Should either surface 64 or 66 engage faces 80 and 50, respectively, the fluctuating of the hydraulic fluid in chamber 88 would be disrupted and boost pressure development impaired. In addition, it is important that all of the air be removed from chamber 88 so that in the development of the fluid pressure is a result of the movement of disc 44 and the bulk modulus of the hydraulic fluid. Thus all the fluctuating force communicate through disc 44 is applied to pressurize the hydraulic fluid in chamber 88. The air from chamber 88 is removed by opening a bleed screw 89 connecting passage 87 to the surrounding environment.

Figure 5:
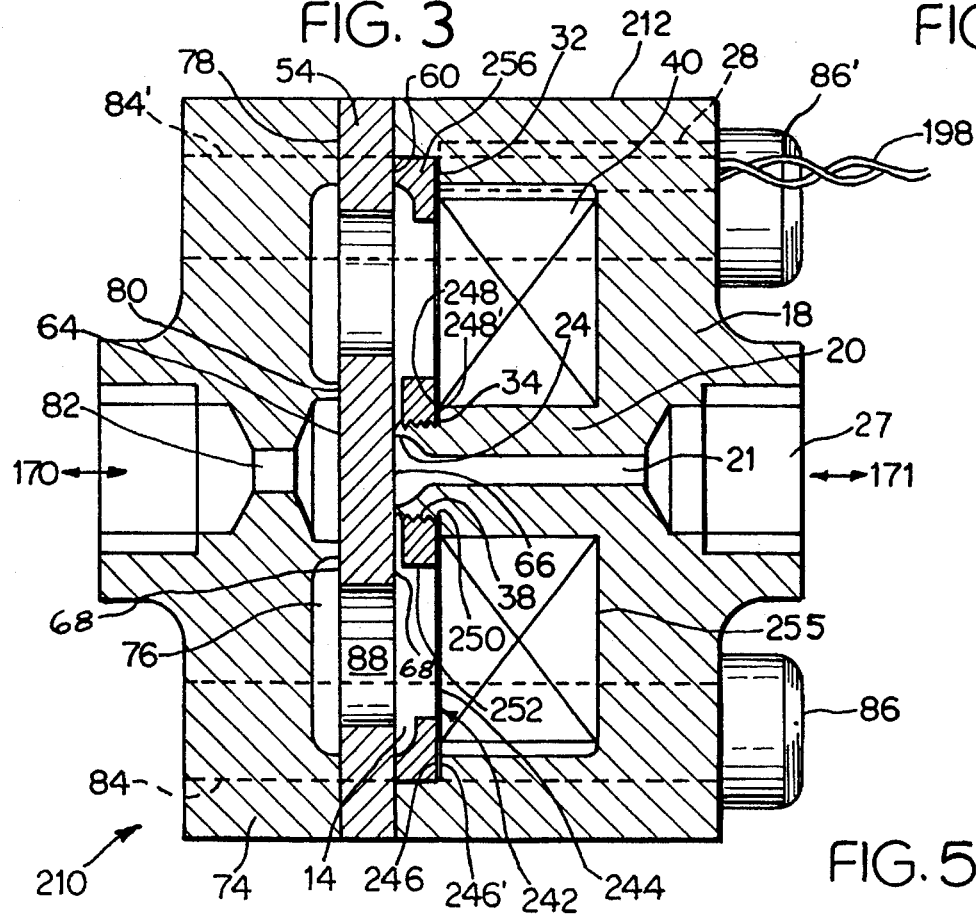
FIG. 5 is a section view of an other embodiment of the ultrasonic pump of the present invention.

The pump 10 illustrated in FIGS. 2, 3 and 4 would perform in a satisfactory manner however under some circumstances it may be desirable to secure the first diaphragm to the first housing 12 in a different manner such as set forth in the embodiment for pump 210 of FIG. 5. In FIG. 5 components for pump 210 which are identical to the components for pump 10 are identified with the same number as in FIG. 2.

The surface 38 of stem 20 of pump 210 is threaded from shoulder 34 to face or seat 24. The first diaphragm 242 a discs 244 with a nylon coating 52 is applied to peripheral surfaces 246, 246' and central surfaces 248, 248'. Discs 244 has a central opening 250 located on stem 20 such that peripheral surface 246' and central surface 248' are respectively located on shoulders 32 and 34. Discs 244 may have a truncated shape such that peripheral surface 248' engages shoulder 32 prior to surface 246' engaging shoulder 34. A fastener or nut 252 is threaded on surface 38 and torque applied such that when surface 246' engages shoulder 34 a predetermined axial force is applied to the plurality of piezoelectric discs 40 retained in resulting chamber 254. The nylon coating on surfaces 246' and 248' is compressed to form a seal such that hydraulic fluid thereafter present in chamber 88 is isolated from chamber 254. To assist in the development of a peripheral seal for discs 244, a ring 256 is located between surface 60 on diaphragm 54 and surface 246 on discs 244. When bolts 86, 86' ... 86" are torqued into threads in the second housing 74 to join the first housing 212 to the second housing 74 a force is transmitted through ring 256 to urge surface 246' into engagement with shoulder 32 to assist in defining the seal between chamber 88 and chamber 55.

The operation of pump 210 is identical to pump 10 in that the plurality of piezoelectric discs 40 receive operational current through lead 198 from ECU 200 to develop a actuation force to change the hydraulic fluid pressure of the hydraulic fluid supplied from the master cylinder 104. The fluctuating force has an axial component and a radial component wherein only the axial component is communicated to the first diaphragm 242. After the axial component of the fluctuating force overcomes the predetermined axial force as established by the torque applied to nut 252 and the pressure of the hydraulic fluid in chamber 88 changes as a function of the axial component force. This change in fluid pressure causes the central surfaces 64 and 66 of the second diaphragm 54 to sequentially move toward and away from faces 80 and 24, respectively as a result of such axial component of the fluctuating force. Such sequentially movement of the second diaphragm 54 causes hydraulic fluid to be communicated from chamber 88 through passage 21 in stem 20 to outlet port 27 for distribution to the brake system by way of conduit 171.

We claim:

1. An ultrasonic pump, comprising a first housing connected to a second housing with a cavity formed therebetween, said first housing having a central stem that extends into said cavity with a passage for connecting said cavity with an outlet port, said second housing having an inlet port for communicating hydraulic fluid to said cavity, a plurality of piezoelectric disc surrounding said stem, a first diaphragm secured to said stem for isolating said piezoelectric disc from hydraulic fluid supplied to said cavity and for placing a predetermined axial force on said piezoelectric disc, a second diaphragm located in said cavity between said passage and said inlet port, and means to excite said piezoelectric discs to develop a fluctuating force having an axial component and a radial component, said axial component of said fluctuating force after overcoming said predetermined axial force changing the fluid pressure of the hydraulic fluid in said cavity as a function of said axial component force, said change in fluid pressure causing sequential movement of said second diaphragm toward said inlet port and said passage to transmit hydraulic fluid from said cavity through the passage to said outlet port.

2. The ultrasonic pump as recited in claim 1 wherein said first diaphragm is a first metallic disc with a first annular lip which extends from a peripheral surface and a second annular lip which surrounds a central opening, said first annular lip engaging said first housing and said second annular lip engaging said stem to retain said piezoelectric disc in said first housing.

3. The ultrasonic pump as recited in claim 1 further including:

means connected to said cavity for bleeding any air present therein which could effect the movement of hydraulic fluid through said passage.

4. The ultrasonic pump as recited in claim 1 further including:

fastener means connected to said stem for locating said first diaphragm in said cavity to develop said predetermined axial force on said piezoelectric disc.

5. The ultrasonic pump as recited in claim 2 further including:

a ring located between said first and second diaphragms through which a clamping force is applied to said first diaphragm to assist in isolating said piezoelectric disc from hydraulic fluid.

6. The ultrasonic pump as recited in claim 5 further including:

a nylon coating formed in an annular peripheral surface of said second diaphragm, said nylon coating assisting in forming a seal for said cavity when said first housing is joined to said second housing.

7. The ultrasonic pump as recited in claim 4 wherein said first housing includes: a passageway through which environmental pressure is communicated to said piezoelectric disc to prevent the creation of a vacuum which could effect development of said fluctuating force.

8. The ultrasonic pump as recited in claim 7 wherein said first housing further includes: a first shoulder located on said stem and a second shoulder located on a peripheral surface within said cavity, said first and second shoulders being in a same plane within said cavity, said fastener means urging an inner surface on said first diaphragm into engagement with said first shoulder while said ring urges an outer surface into engagement with said second shoulder to develop said predetermined axial force on said piezoelectric disc.

9. The ultrasonic pump as recited in claim 8 wherein said first housing includes: a first face with a first seat which surrounds said passage, said first seat being in a second plane corresponding to a first external surface of said first housing.

10. The ultrasonic pump as recited in claim 9 wherein said first housing further includes: a second face with a second seat which surrounds said inlet port, said second sect being in a third plane corresponding to a second external surface on said second housing.

11. The ultrasonic pump as recited in claim 10 wherein said second diaphragm includes: a metallic disc having parallel first and second surfaces extending from a peripherial edge and defined by a substantially first thickness and parallel first and second central surfaces defined by a substantially second thickness, said first thickness on said disc being located between said first external surface on said first housing and said second external surface on said second housing to define substantially equal first and second distances between said first and second central surfaces and said first and second seats in the absence of excitation of said piezoelectric disc.

12. The ultrasonic pump as recited in claim 11 further including:

a plurality of bolts that extend through said first housing and engage corresponding threads in said second housing, said bolts being torqued by a force to compress said nylon coating and define said equal first and second distances.

13. The ultrasonic pump as recited in claim 11 wherein said first and second central surfaces of said metallic disc of said second diaphragm responds to changes in said fluid pressure in said cavity by moving toward but never touching said first and second seats.

14. The ultrasonic pump as recited in claim 2 further including:

a nylon coating formed in an exterior surface of said first annular lip and an interior surface of said second annular lip, said nylon coating being compressed to define an interference seal between said first metallic disc of said first diaphragm and said first housing to assist in sealing said cavity from a actuation chamber for said piezoelectric disc in said first housing.

15. The ultrasonic pump as recited in claim 14 wherein said first housing includes a first shoulder located on said stem and a second shoulder located in a same plane within said cavity, said metallic disc of said first diaphragm engaging said first and second shoulders to define a actuation chamber for said piezoelectric disc within said cavity.

16. The ultrasonic pump as recited in claim 15 wherein said first housing further includes: a second passage connecting said actuation chamber to the surrounding environment for communicating atmospheric pressure to said actuation chamber to prevent the development of a vacuum during the excitation of said piezoelectric disc which could effect the axial component of said fluctuating force.

\* \* \* \* \*